United States Patent [19]
Duddy

[11] 3,901,729
[45] Aug. 26, 1975

[54] METHOD AND APPARATUS FOR TERMINATING THE CHARGE OF STORAGE BATTERIES

[75] Inventor: Joseph C. Duddy, Trevose, Pa.

[73] Assignee: ESB Incorporated, Philadelphia, Pa.

[22] Filed: Sept. 26, 1973

[21] Appl. No.: 401,055

Related U.S. Application Data

[63] Continuation-in-part of Ser. No. 184,570, Sept. 28, 1971, abandoned.

[52] U.S. Cl. .................................................. 136/3
[51] Int. Cl. .......................................... H01m 1/08
[58] Field of Search ........................................ 136/3

[56] References Cited
UNITED STATES PATENTS

| | | | |
|---|---|---|---|
| 3,462,303 | 8/1969 | Reber | 136/3 |
| 3,522,507 | 8/1970 | Seiger | 136/3 R |
| 3,554,804 | 1/1971 | Carson | 136/3 |

*Primary Examiner*—John H. Mack
*Assistant Examiner*—H. A. Feeley
*Attorney, Agent, or Firm*—Wm. Wharton Smith; Robert H. Robinson, Esq.; Anthony J. Rossi, Esq.

[57] ABSTRACT

A storage battery cell has positive and negative plates flooded by electrolyte. When the battery is charged, gas bubbles are produced in the electrolyte. Baffles are arranged to segregate the hydrogen gas bubbles evolved by a portion of the negative plates from oxygen bubbles formed by the positive plates. A hydrogen gas consuming electrode is submerged in the electrolyte and is located so that a stream of hydrogen bubbles impinges thereon. The gas electrode produces an electric current as a result of the presence of hydrogen and the current is approximately proportional to the quantity of gas impinging on the electrode. When the cell reaches a fully charged state, there is a rapid increase in the rate of gas evolution from the negative plate. This causes a similar increase in the current produced by the electrode. A current sensitive device is used to monitor the current flow and initiate a charge termination sequence when the battery reaches a fully charged state as indicated by the gas electrode. An oxygen consuming electrode may be arranged in a similar fashion to sense the oxygen evolution of the positive plates. A pre-selected rise in current flow from positive gas electrode to negative gas electrode can likewise be used to indicate that both positive and negative plates are fully charged.

5 Claims, 9 Drawing Figures

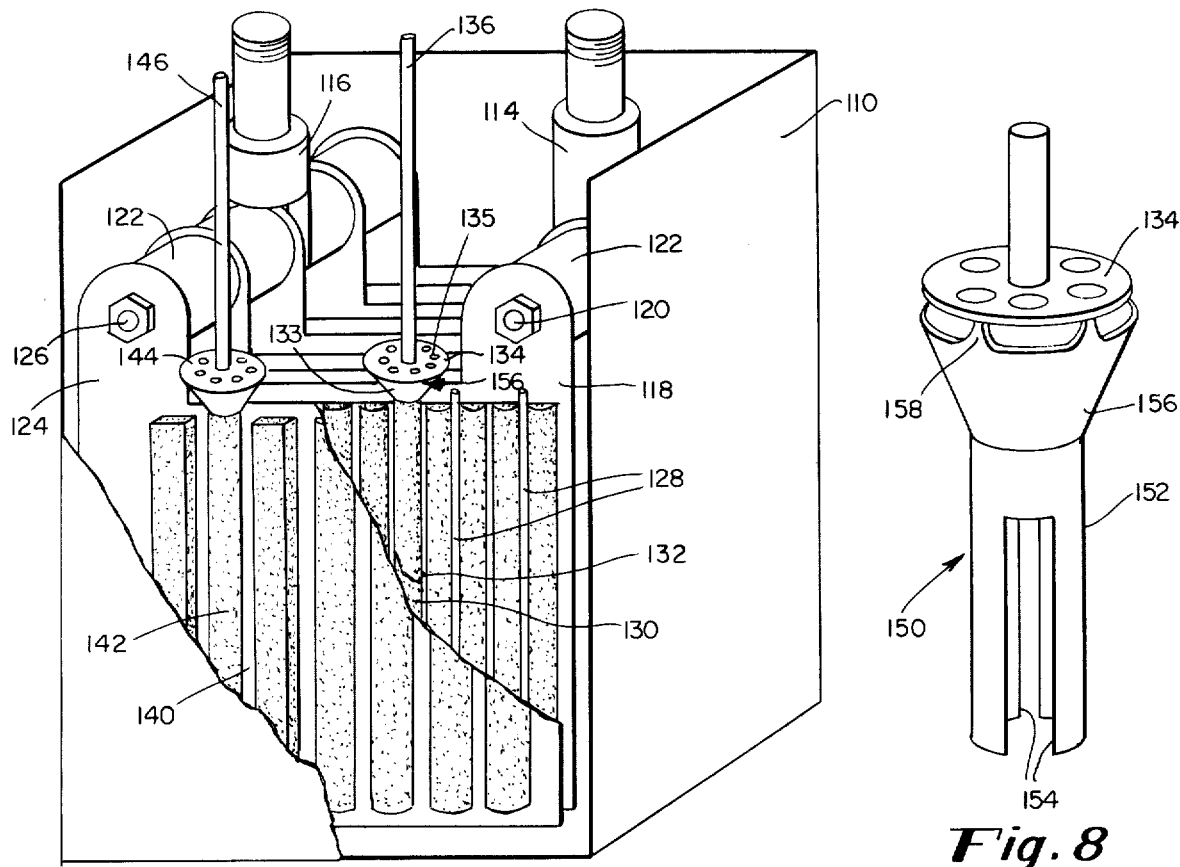
Fig. 7
Fig. 8
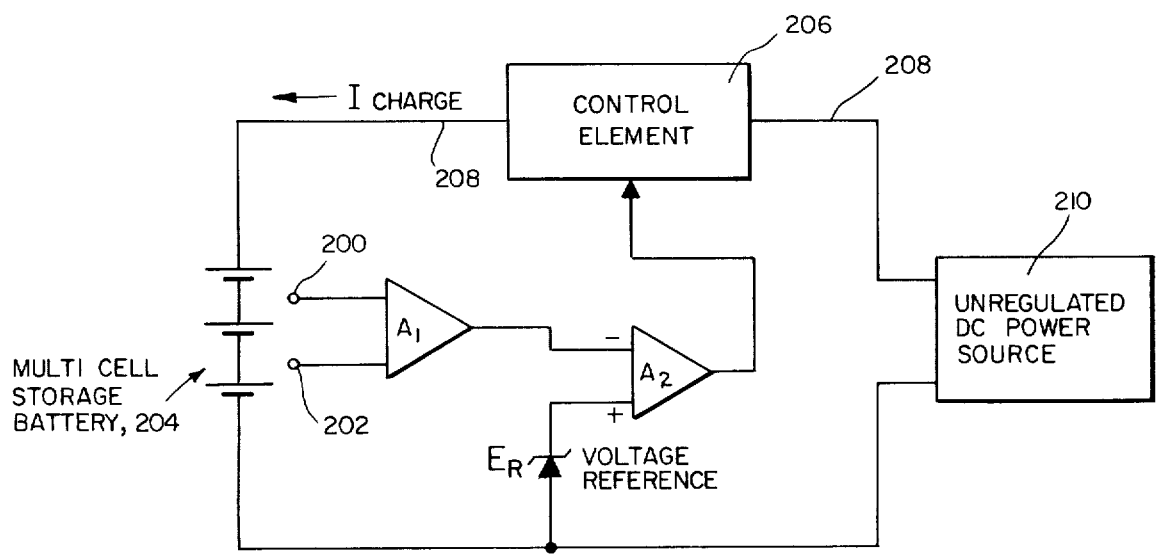
Fig. 9

METHOD AND APPARATUS FOR TERMINATING THE CHARGE OF STORAGE BATTERIES

REFERENCES

This application is a continuation-in-part of U.S. patent application Ser. No. 184,570 filed Sept. 28, 1971, now abandoned, in the name of Joseph C. Duddy, inventor.

BACKGROUND OF THE INVENTION

1. Field of the Invention

This invention relates to wet storage batteries. In particular, it relates to a method and apparatus for terminating the charge of such batteries and to batteries having auxiliary electrodes therein for use with the method.

2. Description of the Prior Art

In order to provide the full potentially available electrical capacity in a storage battery, it is necessary that it be fully charged prior to each use cycle. If, in the charging operation, it receives more charge than necessary, the life of the battery is reduced. Therefore, to achieve both maximum capacity and maximum life, means are needed for determining the exact point at which the battery is fully charged. Automatic equipment which will sense this point and terminate the charge provides the normal end product of any charge termination system.

Although in theory the two plate groups of a storage battery cell are always at the same state of charge, in practice it is often found that they are not always at the same charge level. Local action causes lead acid or iron alkaline negative plates to lose charge. High temperatures can likewise cause nickel alkaline type positive plates to lose charge. Also, during the charging operation, the two plate groups may not accept charge with the same degree of efficiency. To insure that a storage battery is fully charged, it would be desirable to sense the states of charge of both the positive plate group and the negative plate group.

The most usual forms of charge control, and by this is meant a means for automatically terminating the charge of a storage battery, are based upon the voltage of the battery while on charge. The charge voltage rises as the battery is charged reaching a maximum at the fully charged state. Unfortunately, the charge voltage of a cell besides being a function of the state of charge of the cell is also dependent upon the charge rate, the battery temperature and the age of the battery. Because of these variables, the charge voltage method is not strictly accurate. In order to insure that the battery is fully charged, it is usual to supply somewhat more charge than indicated by the voltage rise. This, as noted above, can shorten the overall life of the battery.

Other charge control methods have been employed. Ampere hour meters are sometimes used to measure the charge removed from a battery and to measure the charge returned. Measurements of the strength of the acid in lead acid cells is sometimes used as an indicator of the fully charged state. Also, other control means are recognized in the storage battery art.

The above mentioned charge control devices fail either because they do not measure a function that is directly associated with the state of charge of both electrode groups or because the variable being measured is dependent upon other factors besides the state of charge.

Auxiliary electrodes have been used with cells and particularly with sealed cells for determining the full charged state. The usual practice is to use a single electrode as a gas recombination electrode, cutting off the charge when the partial pressure of gas reaches a predetermined limit.

In order to be operative, it has been the practice to operate such electrodes in a moist but not fully wet state. This requirement in turn has resulted in exacting manufacturing and operating procedures to obtain and preserve the correct degree of "dryness" which will provide for the satisfactory operation of the electrode as well as for proper operation of the sealed cell of which it is a part.

SUMMARY OF THE INVENTION

A storage battery cell comprises a positive electrode group, and a negative electrode group submerged in aqueous electrolyte. The storage battery couple is such that when the cell is fully charged and receives a further charging current gas bubbles will evolve from both plate groups. A baffle arrangement segregates a portion of the gas bubbles given off by one of the plate groups from the gas bubbles given off by the other plate group. A gas reacting electrode is so located in the electrolyte that segregated gas bubbles will impinge thereon. The gas reacting electrode produces an output current corresponding to the rate of gas bubble evolution. The gas bubble evolution increases rapidly at the time the cell reaches a fully charged state and the corresponding change in the output of the gas electrode can be used to initiate charge termination means. The segregated gas may be hydrogen from the negative plates (best for lead acid cells) or oxygen from the positive plate (useable with nickel iron cells). The electrical circuit includes connected in series; the gas electrode, a current sensing device and the cell electrode which is not evolving the gas bubbles that impinge on the gas electrode. Alternately, two electrodes, one working on positive gas e.g. oxygen and one working on negative gas e.g. hydrogen may be used. In this case the circuit will include connected in series; the first gas electrode, the current sensing device and the second gas electrode. The current sensing device may be a simple current sensing relay or it may include electronic amplifiers, etc. It is usual for the end of charge sensor to initiate an overcharge timer, the timer actually providing the charge termination and thereby giving the battery a desired overcharge.

BRIEF DESCRIPTION OF THE DRAWINGS

FIG. 7 depicts an alkaline battery cell including an embodiment of the invention;

FIG. 8 depicts a baffle as used in the cell of FIG. 7; and,

FIG. 9 depicts an electrical circuit suitable for use with the cells of FIGS. 6 and 7.

DESCRIPTION OF THE PREFERRED EMBODIMENT

Figure 1:
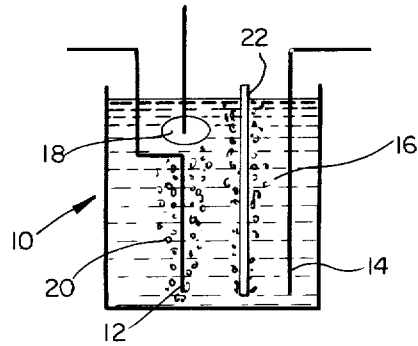
FIG. 1 depicts in diagramatic form a first embodiment of the invention.

FIG. 1 indicates in outline form a storage battery cell 10 having two species of plates 12 and 14 therein. The plates 12, 14 are submerged in an aqueous electrolyte 16. A gas reacting electrode 18 is placed over the top of the first electrode species 12 so that some of the gas bubbles 20 emitted by the electrode 12 impinge upon the bottom surface of electrode 14. The gas reacts at the electrode 18 and produces an electric potential with respect to either of the electrodes 12 or 14. A separator 22 made of porous material located between the two plates forms a baffle for and segregates the gas from the electrode 14 from the gas from electrode 12 thus preventing the former gas from inadvertantly impinging on the surface of the electrode 18. Because of the electrolyte is aqueous the gasses evolved from electrodes 12 and 14 at full charge are hydrogen (from the negative plate) and oxygen (from the positive plate). If both gasses should be fed to a single electrode they could, under some circumstances, recombine on the electrode with no flow of current. When the cell is fully charged, the total gas evolved from the positive plate and the total gas evolved from the negative plate is related to the charge current by the well known stoichimetric equation:

$$2H_2O \rightleftarrows 2H_2 + O_2$$

Figure 2:
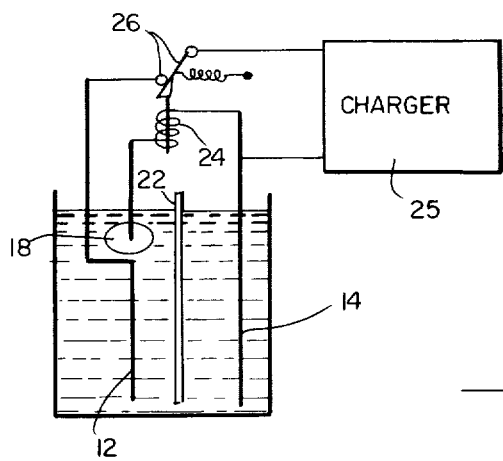
FIG. 2 depicts a cell of the embodiment of FIG. 1 with an associated electrical circuit.

A basic circuit for making use of the invention in its simplest form for charge termination is shown in FIG. 2. A low voltage relay 24 is connected between the gas electrode 18 and the antipode electrode 14. The relay 24 is of the type that is normally open and can be manually closed. When a sufficient current flows greater than a preselected value in its coil, the amature will move causing the contacts to open and stay open till manually reset. A battery charging device 25 is connected to the electrodes 12 and 14 through the contacts 26 of relay 24. With the lead acid battery system the negative plates give off very little gas until fully charged at which time the gassing rate rises very rapidly. The gassing behavior of the positive plate is very similar. There is a reaction known as "local action" which occurs at the negative plate which tends to keep the negative plates in a lower state of charge than the positive plate. The local action is made apparent by a slight but continuous evolution of gas bubbles from the negative plates. Because the negative plates tend to lag the positive plates and because the negative plates have a very sharp change in gassing rate at the time full charge is reached, it is often desirable to locate the gas electrode over the negative plates rather than over the positives. The relay 24 must be such that the gas flow from local action is not sufficient to cause it to operate, yet it must operate on the gas evolution from the plate 12 at a normal charge rate and including normal variations in the charge rate due to line fluctuations, etc. This does not impose too great a restriction on relay 24 because in a typical instance with gas electrodes as described, the current produced by the local action gas stream on a typical electrode is in the order of tens of micro amperes whereas at full charge with a normal charge current passing the gas, recombination current is in the order of milliamperes. It should be noted that since there is roughly a 100 fold change in current between the not charged and fully charged gas evolution, the exact charge rate is not critical and can vary over a fairly large range without materially changing the determination of the point of full charge.

Figure 3:
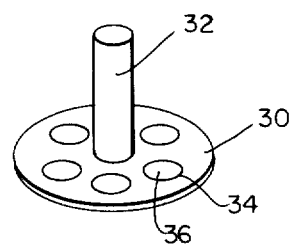
FIG. 3 depicts a preferred sensing electrode as used in the embodiment shown in FIGS. 1 and 2.

Many electrodes have been described suitable for reacting hydrogen and reacting oxygen in aqueous electrolytes, both acidic and basic. Such electrodes are used in the fuel cell art. In general, these electrodes operate with one side exposed to the gaseous phase and the other side exposed to the electrolyte. Such electrodes must be waterproof in order that the electrolyte will not flood the pores and reduce their operating efficiencies. The use of electrodes of the present invention differs from these electrodes in that both the reacting gas and the electrolyte are present on the same side of the electrode. FIG. 3 illustrates a preferred electrode for the implementation of the invention. In FIG. 3 a graphitized carbon wafer 30 in the order of one inch in diameter and about ⅛ inch thick is threaded to a waterproofed carbon rod 32. A series of holes 34 contain small biscuits 36 of catalyst material. For a hydrogen consuming electrode, the catalyst is a mixture of activated carbon powder and polyfluorocarbon binder and a small quantity of platinum. To prepare the electrode described, a mix is made of activated carbon, polyfluorohydrocarbon binder (such as polytetrafluoroethylene) in emulsified form and a small quantity of 10% chloroplatinic acid. The ratio of dry carbon to dry binder should be on the order of 10 to 20 to 1. This mix is pasted into the holes 34 drilled through the graphite disc 30, dried and compacted. After this, the entire disc is given a light coating of polyfluorocarbon emulsion as by spraying. It is important that the bottom surface of the electrode including the biscuits of catalyst is flat. If there are depressions in the bottom surface they will trap gas bubbles and detract from the sensitivity of the electrode.

A similar electrode but without the platinic acid is suitable for an oxygen sensing electrode.

Other configurations of electrodes may be used as called for by any specific design of storage battery cell.

Figure 4:
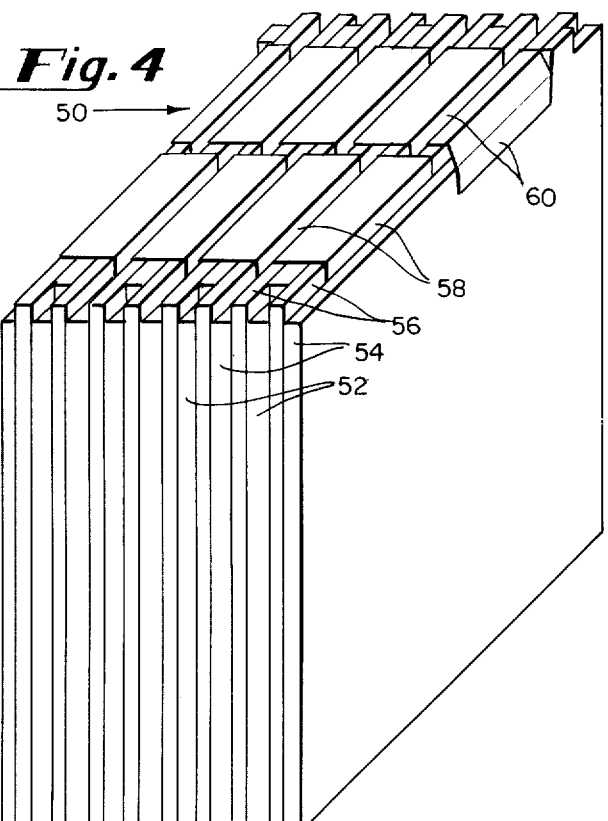
FIGS. 4 and 5 depict in perspective a lead acid battery element according to a second embodiment of the invention.

In FIG. 4 is shown a typical lead acid storage battery cell element 50. This element comprises positive plates 52, negative plates 54 and separators 56. A separator is located between each adjacent positive and negative plates. Straps, not shown, connect the positive plates together and the negative plates together. A series of gas impervious baffles 58 are arranged to cover a portion of the top of the positive plates and the adjacent separator portions but leaving the tops of the negative plates in the same area open to the top of the cell. A second series of similar baffles 60 close off the tops of the negative plates in a second area at the top of the element.

Figure 5:
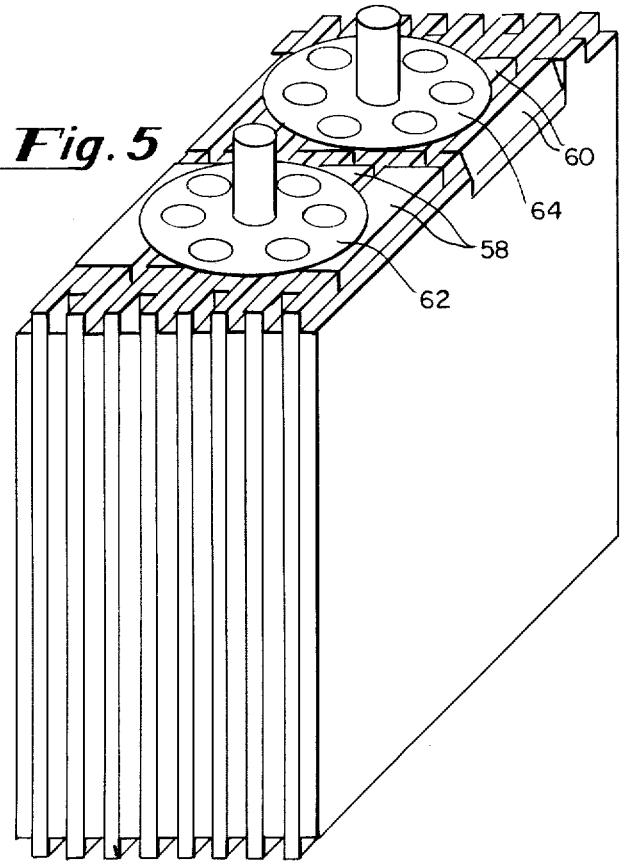

FIG. 5 shows the same element with two of the electrodes as described above. A hydrogen consuming electrode 62 is located above baffles 58 and an oxygen consuming electrode 64 is located over baffles 60. The element as described including the gas consuming electrodes must be located in a battery cell jar (not shown) and covered with electrolyte (sulfuric acid solution — not shown) to become operative.

Figure 6:
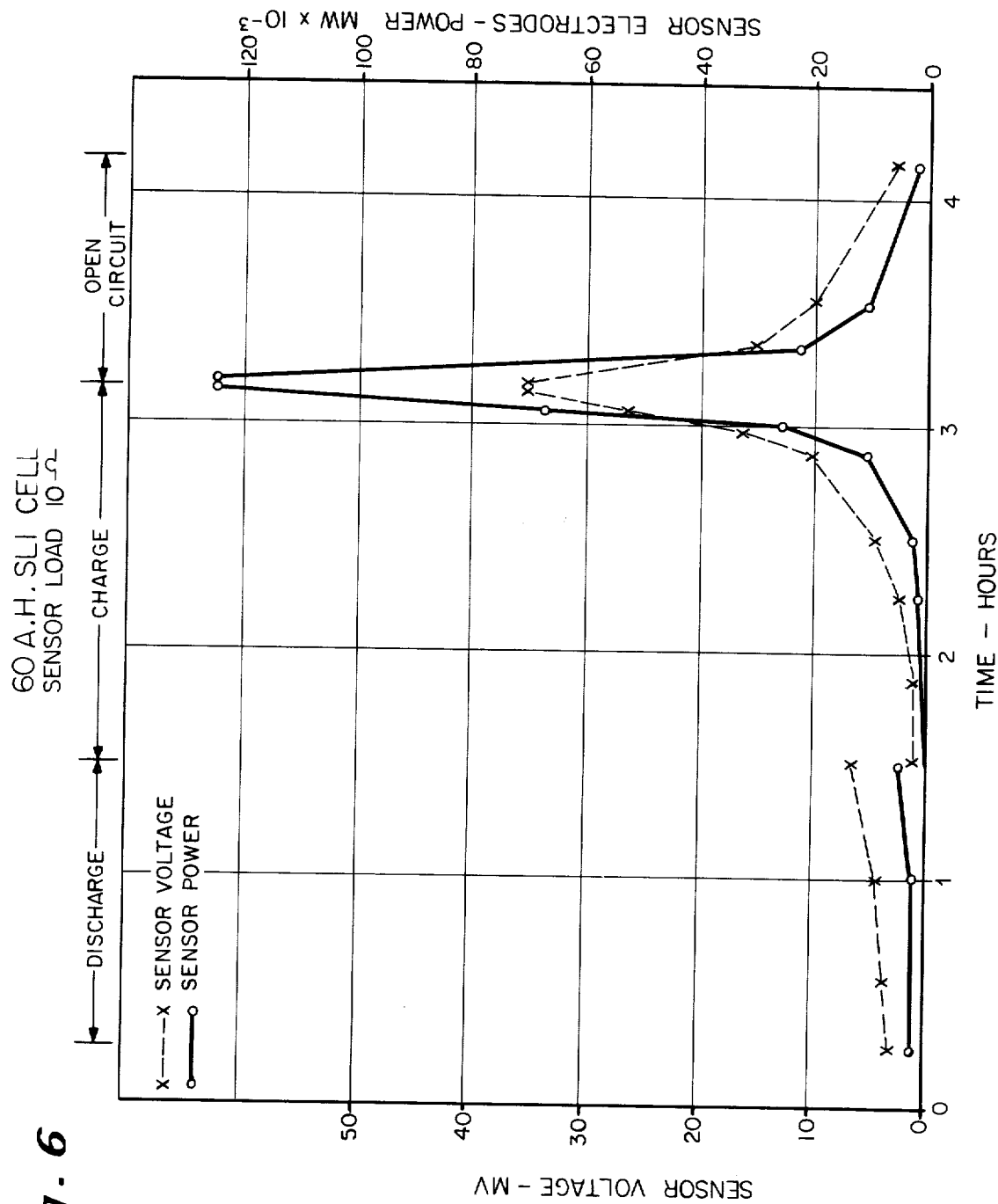
FIG. 6 shows in graphic form an electrical characteristic of the cell of FIG. 5.

FIG. 6 shown in graphical form a typical charge cycle of a lead acid automobile battery cell having an element as depicted in FIG. 5. From FIG. 6 it is readily seen that the power available from the electrode (current times voltage) varies from a value of less than $1 \times 10^{-3}$ milliwatts at the start of the charge cycle to a maximum in the neighborhood of $125 \times 10^{-3}$ milliwatts or a ratio of at least 120 to 1.

FIG. 7 depicts another embodiment of the invention, in this case as applied to an alkaline electrolyte battery such as a nickel-iron cell. In FIG. 7, 110 represents a typical nickel iron storage battery cell container. Within container 110 are found a positive post 114 and a negative post 116. Typical tubular positive plates 118 are attached to the positive post 114 by positive connecting rod 120 and spacing washers 122. Likewise, the negative plates 124 are connected to the negative post 116 by negative connecting rod 126 and spacing washers 122. Pin insulators 128 prevent positive and negative plates from touching. A portion 130 of one of the positive plates 118 is enveloped by an electrolyte permeable gas impermeable gas deflecting means 132. This can be fabricated from available porous sheet materials such as are used for battery separators or to be made of similar materials. This device directs the oxygen gas escaping from the portion 130 of the positive plate 118 to the oxygen gas electrode 134 similar to the oxygen electrode described above. A carbon rod 136 serves as a conductor lead from the electrode 134.

In FIG. 8 a baffle 150 such as 132 is shown in enlarged form removed from the plate structure. The baffle comprises a tubular section 152 made from available porous sheet or tubular materials such as are used for battery separators. Slits 154 permit the baffle to slip over a portion of the plate. The enlargement 156 serves to direct and confine gas bubbles trapped by the baffle to the sensing electrode 134 located slightly above its mouth and supported there by means such as legs 158. The baffle may be sealed to the plate along the edges of slots 154 by means of a suitable cement such as an epoxy type, etc.

A portion 140 of FIG. 7 of one of the negative plates 124 is enveloped by a similar electrolyte permeable, gas impermeable, gas deflection means 142 similar to the positive gas deflection device 132. It is important that the ratio of the plate areas 130 and 140 enclosed respectively by the gas deflecting means 132 and 142 is approximately equal to the ratio of the total active positive and total negative plate areas. A hydrogen gas electrode 144 as described above is located at the exit end of the negative plate gas deflecting means 142. A carbon rod 146 serves as a conductor lead from the electrode 144.

A second electrical circuit is shown in FIG. 9, suitable for use with the cells illustrated in FIGS. 5 and 6. In FIG. 9, amplifier $A_1$ amplifies the voltage between the sensing electrodes 200 and 202 located in one cell of the multicell battery 204 to a level comparable to the magnitude of the reference voltage $E_R$. Voltage reference $E_R$ is a typical reference source such as a Zener diode. Amplifier $A_2$ is a differential amplifier whose output voltage is proportional to the difference between voltage reference $E_R$ and the output of amplifier $A_1$. A control element 206 whose series resistance is proportional to the control voltage produced by Amplifier $A_2$ such as, but not necessarily limited to, a transistor is located in charging lead 208. The control element effectively regulates the charge current supplied by the unregulated DC power source 210 by controlling the resistance between this source and the battery.

For example, the unregulated DC power source 210 might have a voltage of 10V and the battery 204 might have a voltage of 6V. If the resistance of the control element 206 is controlled at 2 ohms, a charge current of 2 amps would be provided. If the control element resistance is raised to 20 ohms, the charge current becomes 0.2 amps. Typically the system operates as follows: at the start of a charge, the output voltage of Amplifier $A_1$ is less than voltage $E_R$ and therefore the voltage output of $A_2$ is positive. Assume that a positive voltage will cause the control element 206 to have a very little resistance, allowing the battery to charge at a very high current. As the battery becomes fully charged, the generation of hydrogen and oxygen commences and therefore the voltage produced between the sensing electrodes 200, 202 increases sharply. In turn, the voltage from the output of Amplifier $A_1$ increases sharply so that this voltage now approaches the magnitude of the voltage reference $E_R$ such that the difference between $E_R$ and the output of $A_1$ approaches 0. Accordingly the output voltage of Amplifier $A_2$ diminishes. The control element 206 is so designed that a diminishing positive voltage applied to it causes an increase in resistance. Therefore, as the output of Amplifier $A_2$ diminishes the series resistance increases. This will have the effect of reducing the charge current applied to the battery.

In the example presented above, the control element 206 would typically be NPN type transistor whose emitter is connected to the positive terminal of the battery.

The collector is connected to the positive terminal of the unregulated power source and the base (or control gate) is connected to the output of $A_2$.

The several examples given above serve to illustrate particular embodiments of my invention. However, these are not to limit the broader aspects of the invention and other embodiments will be apparent to those skilled in the art.

I claim:

1. In a storage battery cell comprising a first plate species, a second plate species the two plate species submerged in an aqueous electrolyte and in ionic contact therewith, the storage battery cell being further characterized in that when the cell is fully charged and receives a charging current gas bubbles are evolved at the two electrode species in the electrolyte, the improvement which comprises:
    a. a first means for segregating the gas bubbles evolved from at least a portion of the first plate species from gas bubbles evolved from the second plate species; and,
    b. a first means for reacting gas from the gas bubbles and producing electric current thereby, the first means for reacting being submerged and so located in the cell electrolyte that segregated gas bubbles from at least a portion of the first plate species will impinge thereon.

2. A storage battery cell is defined in claim 1 wherein the plate species from which gas bubbles evolve and impinge on the first means for reacting is the negative plate species, the gas bubbles evolved from the negative plate species at full charge is hydrogen gas and the means for reacting gas is a hydrogen gas electrode.

3. A storage battery cell as defined in claim 1 wherein the plate species from which gas bubbles evolve and impinge on the first means for reacting is the positive plate species, the gas bubbles evolved from the positive plate species at full charge is oxygen and the means for reacting gas is an oxygen gas electrode.

4. A storage battery cell as defined in claim 1 further including:
   a. a second means for segregating, the second means segregating the gas bubbles evolved from at least a portion of the second plate species from gas bubbles evolved from the first plate species;
   b. a second means for reacting gas from the gas bubbles and producing electric current thereby, the second means for reacting being so located in the cell electrolyte that segregated gas from at least a portion of the second plate species will impinge thereon.

5. A storage battery cell as defined in claim 1 including charge termination means operatively connected to the first means for reacting gas, so that when the current produced by the first means for reacting gas is greater than a preselected value the charge termination means becomes operative.

* * * * *